Dec. 15, 1964   A. H. WILLINGER ETAL   3,161,058
THERMOMETER ASSEMBLY
Filed Aug. 15, 1960
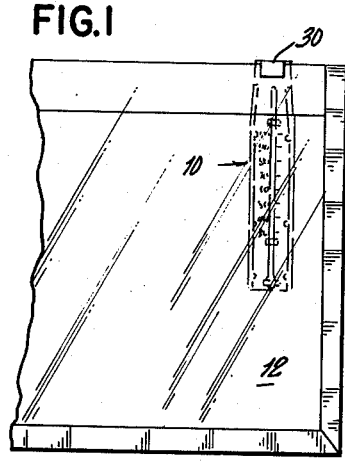
FIG. 1
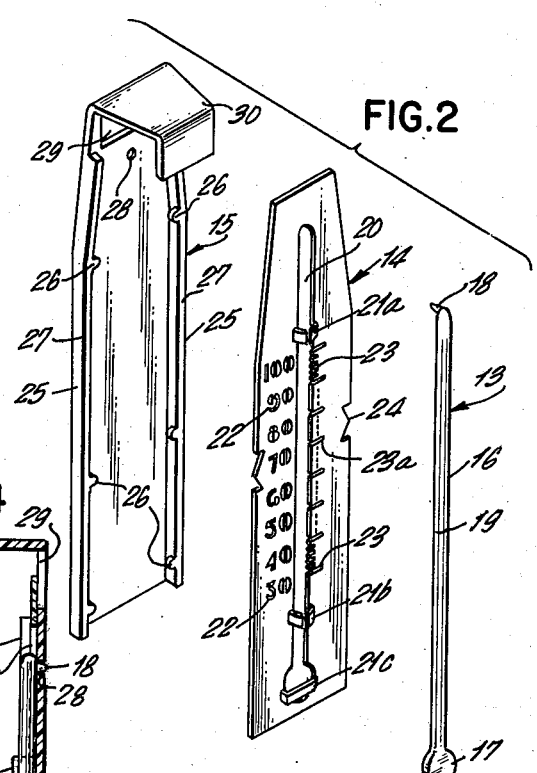
FIG. 2
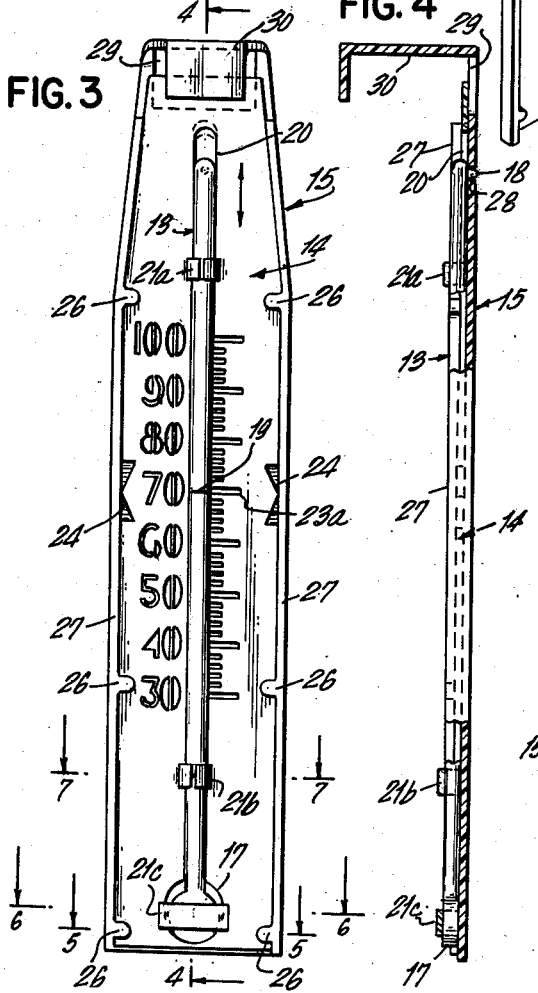
FIG. 3  FIG. 4
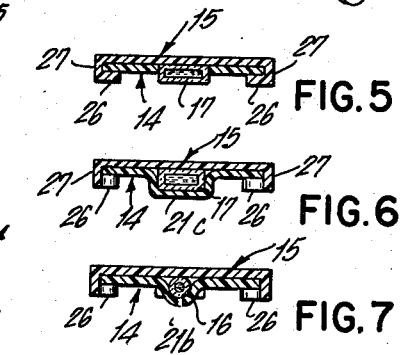
FIG. 5
FIG. 6
FIG. 7
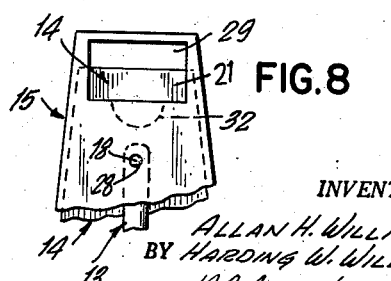
FIG. 8
INVENTORS
ALLAN H. WILLINGER
BY HARDING W. WILLINGER
ATTORNEY

United States Patent Office 3,161,058
Patented Dec. 15, 1964

3,161,058
THERMOMETER ASSEMBLY
Allan H. Willinger and Harding W. Willinger, New Rochelle, N.Y., assignors to Aquariums Incorporated, Maywood, N.J., a corporation of Delaware
Filed Aug. 15, 1960, Ser. No. 49,719
7 Claims. (Cl. 73—376)

This invention relates to a thermometer and more particularly to a thermometer assembly adapted for use while continuously immersed in a fluid, such as the water in an aquarium.

It is well understood in the tropical fish hobby that the temperature of the water in an aquarium tank is a critical factor in the successful maintenance and propagation of fish life. A suitable thermometer is therefore a highly desirable, if not an essential, aquarium accessory. A thermometer for aquarium use is usually continuously immersed in the aquarium water and is used under rather rigorous environmental conditions. The thermometer, must as a unit withstand constant wetting or continuous immersion for extended periods of time, such as weeks or months. The liquid level in the thermometer stem and the corresponding scale numerals and graduations must be readily discernible when viewed through the tank wall and contents. Visibility is often considerably impaired by the elements. Furthermore, the scale markings and graduations tend to lose their clarity and often completely disappear when subjected to continuous periods of immersion. Algae and fungus growths often attach themselves to the termometer requiring the use of steel-wool or similar scouring material for removal. This often results in the destruction of the graduated scale markings.

It is therefore an object of this invention to provide a thermometer assembly particularly adapted for use in an aquarium which will serve as a suitable indicator of the aquarium temperature during intermittent or over extended periods of immersion.

It is a further object of this invention to provide an efficient instrument of the character indicated which may be produced in substantial quantities at reasonable cost.

Another object of this invention is to provide a temperature indicator which utilizes plastic molded parts which may be readily assembled by personnel of limited skill and experience without the use of special or costly tooling or fixtures.

A still further object of this invention is to provide a thermometer assembly of the character indicated which may be readily calibrated with respect to a predetermined scale in a very simple and efficient manner to thereby permit the use of mass produced parts and to provide for accurate indication by the assembled unit.

It is also an object of this invention to provide an instrument of the character indicated with a scale arrangement which may be clearly observed and accurately read even under adverse visibility conditions, and which will retain its legible condition even after continuous immersion over extended periods of time, or vigorous cleaning or scouring.

Other and further objects, benefits and advantages of this invention will become apparent from the description thereof contained in the annexed specification or will otherwise become obvious. It will be understood that the invention here disclosed may be employed for other purposes to which the structure and arrangement are adapted.

In the accompanying drawings:

FIGURE 1 is a fragmentary front elevational view of an aquarium tank showing a thermometer assembly embodying the present invention, suspended therein;

FIGURE 2 is an exploded view of a thermometer assembly in accordance with the present invention;

FIGURE 3 is a front elevational view of the assembled thermometer;

FIGURE 4 is a sectional view of the thermometer assembly shown in FIGURE 3, taken principally along line 4—4 of said FIGURE 3;

FIGURE 5 is a cross-sectional view of FIGURE 3 taken along line 5—5 thereof;

FIGURE 6 is a cross-sectional view of FIGURE 3 taken along line 6—6 thereof;

FIGURE 7 is a cross-sectional view of FIGURE 3 taken along line 7—7 thereof; and FIGURE 8 is a fragmentary rear elevational view of the top portion of the thermometer to more particularly indicate the manner of fixing the scale in calibrated position.

FIGURE 1 illustrates a fragment of an aquarium tank 11 filled with water and having a transparent front wall of glass or the like from the rim of which a thermometer assembly embodying the instant invention, designated generally by the numeral 10, is suspended. It will be noted that the thermometer 10 is immersed in the water and that in this position readings thereof must be taken through the aquarium wall and water.

It will be seen from FIGURE 2 that the thermometer 10 is comprised of a thermometer tube, designated generally by the numeral 13, a scale panel, designated generally by the numeral 14, and a supporting frame or back panel, designated generally by the numeral 15.

The thermometer tube 13 is of conventional form and comprises a tubular glass stem 16 having an enlarged bulb 17 formed at the lower end thereof and a hook 18 extending generally normal to the stem axis at the sealed upper end. A thermally responsive material in liquid form, such as mercury or alcohol, is disposed within the element and rises and falls within the stem in accordance with temperature changes. In the manufacture of thermometer elements of this type, it is the customary practice to indicate a calibration or fiducial point for the stem which is otherwise unmarked. The fiducial line 19 is a calibration mark in the form of a nick scratch, for example, which indicates the level of the fluid in the bore of the stem at 70° F.

In the assembled device, the thermometer tube 13 is disposed within a complementary elongated slot-like aperture 20 formed in scale panel 14. Scale panel 14 is advantageously formed as a relatively thin planar injection molded element and is provided with integrally formed retaining bands or fingers 21, which are deflected from the plane of the panel and extend over the gap of slot-like apertures 20. The thermometer graduated scale markings are disposed along the opposing longitudinal side edges of the slot 20. These markings consist of a column of numerals 22 disposed along one longitudinal side edge of said slot 20 and a column of graduations 23 along the other. The markings are in the form of apertures extending through the body of scale panel. The scale marking apertures are advantageously formed in the molding of the scale panel and thus comprise an integral part of the panel structure. They may also be formed by die-cutting the panel. It will now be noted that the slot aperture 20 is of greater length than the length of the thermometer tube and the lower and upper ends of said slot are so dimensioned as to permit a degree of relative movement between said thermometer tube 20 and the scale panel in order to achieve accurate calibration of the device with reference to the fiducial mark on the stem. In this connection, it will be noted that accurate calibration is achieved when the fiducial mark 19 is in juxtaposition with the numeral 70 and in accurate alignment with the graduation line 23a. It is the commercial practice of thermometer tube manufacturers to place the test or fiducial mark two inches from the tip of the hook plus or minus 1/16". With the hook fixed in position with reference to the scale, a difference of 1/32"

may exist between the scale marking and the fiducial mark, resulting in a substantitl error in readings. The longitudinal marginal side edges of the scale panel 20 are further provided with bracket-shaped cutaway portions or indentations 24. The upper and lower edges of said indentations are intended as a guide to indicate the range of temperatures considered safe for fish life in the aquarium. As heretofore stated, the temperature tube 13 is inserted into slot 20 of the scale panel from the back thereof and is restrained against outward movement by means of projecting fingers 21.

The temperature element and scale panel are locked in assembled position by means of back panel element 15. Said back panel 15 also serves as a support and framing element for the assembly. The back panel 15 comprises a planar body provided with confining flanges 25 disposed along the longitudinal side edges thereof. The confining flanges 25 are advantageously integrally formed with the planar body of the panel and comprise outwardly projecting walls 27 from which inwardly directed bosses 26 project at spaced intervals. The bosses 26 are spaced from the plane of the panel so that a clearance space is formed there between. This clearance space corresponds to the thickness of the scale panel and in effect forms a confining track therefor.

The back panel is further provided with a locking indentation or aperture 28 and an access opening 29. The upper end of the scale and back panels are correspondingly tapered and the upper end of the scale panel overlies a substantial portion of the access opening 29 in the back panel, as may be more particularly seen from FIGURES 3 and 8.

The back panel is further provided with an integrally formed suspension bracket 30 which overhangs the face of the assembly. It will further be noted that the upper ends of the back and scale panels are correspondingly tapered. The upper end of the back panel is provided with an access aperture 29 which serves to expose a portion of the upper end of the scale panel along the back of the device. An opening which may be in the form of an indentation or aperture 28 is provided in the back panel below the access aperture 29 and is dimensioned to receive the tip of hook 18. The back panel is similarly advantageously injection molded of plastic material as an integral unit.

In the assembly of the thermometer, the thermometer tube 13 is inserted into the longitudinally extending slot 20 formed in the scale panel 14. The scale mounted tube is then slid into position within the trackway defined by the confining flanges. The scale panel and thermometer tube are slid into position through the open bottom of the back panel and the inwardly directed bosses serve to press the scale panel against the back panel thus confining it and frictionally retaining it in position. It is noteworthy, however, that the hook 18 of the thermometer tube projects to the rear and bears against the inner surface of the back panel in the course of the insertion of the scale panel. Since the thermometer tube is confined by the bands 21, a slight deflection of the central portion of the fingers and possibly the scale panel will occur during this sliding movement. This resilient action causes the protuberant hook to bear against the back panel face until the aperture 28 is reached. The registration of the hook with the aperture causes the hook to snap into position, thus accurately locating the thermometer tube with reference to the back panel and locking it in position with respect thereto. The fingers 21 project from each side of the slot and extend thereover. Since the fingers are connected to the scale panel at one end and free at the other, they form resilient elements which bear against the thermometer tube holding it securely and accommodating differences in the tube thickness.

It has heretofore been noted that the slot aperture 20 is longer than the length of the thermometer tube so that the scale panel may be shifted axially of the thermometer tube. With the three elements of the thermometer device assembled in the manner indicated, the device may now be calibrated by shifting the position of the scale panel so that the correct scale reading is in juxtaposition with the fiducial mark 19. Thus, the 70° line is brought into registration with the mark 19 on the tube, and a simple axial shifting movement of the scale panel is all that is required for accurately calibrating the device in order to achieve scale readings of the desired accuracy. When this has been accomplished, the position of the scale panel is fixed both with relation to the back panel and thermometer tube. This is accomplished by simply placing a drop of solvent at the portion of the scale panel exposed by the access aperture 29 in the back panel, as indicated at 32 and allowing the solvent to flow between the two panels, as shown in FIGURE 8. The solvent for the plastic material serves to weld the panels in this region and is practically invisible. The scale panel is thus fixed in position with respect to the back panel and the thermometer tube is locked in position with respect thereto. The joint thus formed is not subject to deterioration due to continued exposure to the aquarium water.

As heretofore indicated, the scale indicia in the scale panel are in the form of apertures therethrough. As a consequence of this, the back panel is made visible therethrough. This form of indicia aperture not only prevents the scale graduations and markings from being obliterated in use, but further serves to highlight the numbers and graduations. A further distinct aid to the visibility of the indicia is provided by making the scale and back panels of material of contrasting color. This arrangement not only renders the markings permanent but facilities the scale readings and enhances the aesthetic appearance of the device.

While we have here shown and described a preferred embodiment of our invention, it will be apparent however that this invention is not limited to this embodiment and that many changes, additions and modifications can be made in connection therewith without departing from the spirit and scope of the invention as herein disclosed and hereinafter claimed. Having described our invention what we claim as new and desire to secure by Letters Patent is:

1. A thermometer assembly including a thermometer tube, a scale panel and a back panel, said scale panel comprising a relatively thin planar element provided with an elongated slot-like aperture for receiving said tube for relative movement, retaining elements carried by said scale panel overlying at least a portion of said slot for retaining said tube in position within said slot, said scale panel being provided with graduated scale markings in juxtaposition with said tube, a back panel for said assembly, said back panel comprising a planar body provided with confining flanges disposed along the longitudinal side edges thereof, said scale panel being disposed between said flanges and said tube being retained in position between said retaining elements and the planar body of said back panel, said tube being locked on said back panel against relative movement, and said scale panel being movable relative to said locked tube and back panel for calibration purposes.

2. A thermometer assembly according to claim 1 wherein an indentation is provided in the body of said back panel and said thermometer tube is provided with a hook portion received within said indentation whereby said tube and back panel are locked against relative movement.

3. A thermometer assembly according to claim 1 wherein said graduated scale markings are in the form of apertures extending through the body of said scale panel, said apertures being completely unobstructed to allow for free visibility therethrough.

4. A thermometer assembly according to claim 3 wherein said back and scale panels are formed of materials having a contrasting color.

5. A thermometer assembly according to claim 1 wherein said graduated scale markings are in the form of apertures extending through the body of said scale panel and the passage of light through said apertures is obscured by a portion of said back panel.

6. A thermometer assembly comprising a thermometer tube, a scale panel and a back panel secured to each other against realtive movement in assembled relation, said thermometer tube comprising an elongated tubular stem, a bulbous formation at the lower end of said stem and a hook formation at the upper end thereof, said stem being provided with a fiducial mark intermediate said ends, said scale panel comprising a relatively thin planar body provided with a longitudinally extending slot-like aperture of generally complementary conformation to said thermometer tube, said slot being longer than said thermometer tube to permit their relative longitudinal movement, graduated scale markings carried by said scale panel in juxtaposition with said slot and the thermometer tube disposed therein, said markings comprising apertures extending through the body of said panel and defining unfilled numerals and graduations, retaining elements integrally formed with said scale panel and deflected from the face thereof overlying portions of said slot and said thermometer tube disposed therein, said back panel retaining said scale panel and thermometer tube in assembled relation and comprising a planar body of the general conformation of said scale panel provided with confining flanges formed integrally therewith and disposed along the longitudinal side edges thereof, said flanges comprising outwardly extending walls provided with inwardly directed bosses at spaced intervals therealong, said bosses being spaced from the plane of said back panel, said scale panel being confined in juxtaposition with the planar body of said back panel within the trackway defined by said confining flanges, said back panel being provided with an aperture for receiving the hook portion of said tube and said tube being confined between said retaining elements and the planar body of said back panel, the planar body of said back panel being provided with an opening exposing a portion of the surface of said scale panel and adhesive means disposed within said opening securing said scale and back panels against relative movement, and a suspension bracket for said assembly integrally formed with said back panel, said tube being locked on said back panel against relative movement, and said scale panel being movable relative to said locked tube and back panel for calibration purposes prior to the disposition of said adhesive means.

7. A thermometer assembly including a thermometer tube, a scale panel and a back panel, said scale panel comprising a relatively thin planar element provided with an elonagted slot-like aperture for receiving said tube for relative movement, retaining elements carried by said scale panel overlying at least a portion of said slot for retaining said tube in position within said slot, said scale panel being provided with graduated scale markings in juxtaposition with said tube, a back panel for said assembly, said back panel comprising a planar body, said scale panel being secured in juxtaposition with said back panel and said tube being retained in position between said retaining elements and the planar body of said back panel, said tube being locked on said back panel against relative movement, and said scale panel being movable relative to said locked tube and back panel for calibration purposes.

References Cited by the Examiner

UNITED STATES PATENTS

| | | | |
|---|---|---|---|
| 521,374 | 6/94 | Keene | 73—376 |
| 1,014,547 | 1/62 | Willis | 33—74 |
| 1,551,609 | 9/25 | Norwood | 73—376 |
| 1,612,364 | 12/26 | Elby | 73—376 |
| 1,909,391 | 5/33 | Brown | 73—516 |
| 2,201,186 | 5/40 | Lane | 73—376 |
| 2,600,644 | 6/52 | Hand | 73—376 |

ISAAC LISANN, *Primary Examiner.*